(12) United States Patent
McDonnell

(10) Patent No.: US 11,101,658 B2
(45) Date of Patent: Aug. 24, 2021

(54) TECHNIQUES FOR ELECTRIC POWER DISTRIBUTION AND A SYSTEM IMPLEMENTING THE SAME

(71) Applicant: Non-Synchronous Energy Electronics, LLC, St. Louis Park, MN (US)

(72) Inventor: Alan McDonnell, Hopkins, MN (US)

(73) Assignee: NON-SYNCHRONOUS ENERGY ELECTRONICS, LLC, St. Louis Park, MN (US)

(*) Notice: Subject to any disclaimer, the term of this patent is extended or adjusted under 35 U.S.C. 154(b) by 0 days.

(21) Appl. No.: 16/411,082

(22) Filed: May 13, 2019

(65) Prior Publication Data

US 2020/0235580 A1 Jul. 23, 2020

Related U.S. Application Data

(60) Provisional application No. 62/794,038, filed on Jan. 18, 2019.

(51) Int. Cl.
| | |
|---|---|
| *H02J 3/34* | (2006.01) |
| *H02J 3/38* | (2006.01) |
| *H02J 3/32* | (2006.01) |
| *G05B 19/042* | (2006.01) |

(52) U.S. Cl.
CPC .............. *H02J 3/34* (2013.01); *G05B 19/042* (2013.01); *H02J 3/32* (2013.01); *H02J 3/383* (2013.01); *H02J 3/386* (2013.01); *G05B 2219/2639* (2013.01)

(58) Field of Classification Search
CPC ..... H02J 3/34; H02J 3/32; H02J 3/383; G05B 19/042
See application file for complete search history.

(56) References Cited

U.S. PATENT DOCUMENTS

| 8,073,573 B2* | 12/2011 | Chassin | H02J 13/00002 700/286 |
|---|---|---|---|
| 8,159,178 B2* | 4/2012 | Serban | G05F 1/67 320/101 |
| 8,183,714 B2 | 5/2012 | McDonnell | |
| 9,793,755 B2* | 10/2017 | Garrity | H02J 7/007 |
| 2012/0200155 A1 | 8/2012 | McDonnell | |
| 2013/0054987 A1* | 2/2013 | Pfeiffer | G06F 1/305 713/300 |
| 2014/0001845 A1* | 1/2014 | Bonicatto | H02J 3/14 307/11 |
| 2015/0357936 A1* | 12/2015 | Jeon | H02M 7/537 363/97 |
| 2015/0372490 A1* | 12/2015 | Bakas | H02M 7/42 307/52 |

(Continued)

*Primary Examiner* — Vincent H Tran
(74) *Attorney, Agent, or Firm* — Grossman, Tucker, Perreault & Pfleger, PLLC

(57) ABSTRACT

Techniques are disclosed for providing a variable output micro-grid frequency in order to cause loads and producers coupled to a micro-grid to change operating modes/behaviors accordingly. For example, the utility frequency delivered via the micro-grid may be used as a control signal for the purposes of demand response, e.g., increasing or decreasing load, energy storage control, e.g., to cause storage of energy or the discharging of energy, and generator output curtailment as is mandated by generator interconnection standards such as UL1741 for output power curtailment under high frequency.

18 Claims, 2 Drawing Sheets

(56) References Cited

U.S. PATENT DOCUMENTS

| | | | |
|---|---|---|---|
| 2016/0181861 A1* | 6/2016 | Familiant | H02J 9/062 307/66 |
| 2016/0190866 A1* | 6/2016 | Pelletier | G06Q 10/04 307/64 |
| 2016/0266559 A1* | 9/2016 | Shi | H02J 3/40 |
| 2016/0322863 A1* | 11/2016 | Carnemark | H02J 9/061 |
| 2016/0329713 A1* | 11/2016 | Berard | H02J 3/386 |
| 2017/0310110 A1* | 10/2017 | Clifton | H02J 3/382 |
| 2018/0069404 A1* | 3/2018 | Schult | H02M 7/125 |
| 2018/0358839 A1* | 12/2018 | Perez | G05B 15/02 |
| 2019/0212713 A1* | 7/2019 | Bennett | H02J 13/00 |
| 2020/0153271 A1* | 5/2020 | Poveda Lerma | H02J 9/062 |
| 2020/0295594 A1* | 9/2020 | Reimann | H02J 9/062 |

\* cited by examiner

TECHNIQUES FOR ELECTRIC POWER DISTRIBUTION AND A SYSTEM IMPLEMENTING THE SAME

CROSS REFERENCE TO RELATED APPLICATIONS

The present application claims the benefit of U.S. Provisional Patent Application Ser. No. 62/794,038 filed on Jan. 18, 2019, which is fully incorporated herein by reference.

FIELD

The present disclosure is generally directed to electric power distribution, and more particularly, to techniques for adjusting load, power generation, and energy storage behavior within a micro-grid, with the micro-grid being electrically isolated and un-synchronized from a commercial power grid feeding the same.

BACKGROUND

Commercial utility grids deliver power across a wide, expansive area and may comprise an interconnected network of generating stations to produce electrical power, high-voltage transmission lines that carry power from distant sources to demand centers, and distribution lines that provide power for consumption by individual homes and businesses. Existing utility grids are often decades old, if not older, and are designed to handle, essentially, a few big, predictable sources of energy. A trend over the past ten years has given rise to a large number of renewable energy producers electrically coupling to existing utility grids, which can introduce instability in the grid as power produced by, for instance, solar panels can fluctuate widely based on weather conditions, time of day, and so on. To avoid power interruptions, fluctuations and blackouts, many jurisdictions impose strict energy policies limiting the amount of power that may be introduced by small distributed power producers, and the particular percentage that may be provided by one type of energy such as wind power versus another type of energy such as solar, for example. In addition, some economic forces continue to limit the large-scale introduction of power from end-user locations onto the grid. However, growing political and environmental concerns have begun to necessitate solutions that use existing utility grid systems but still allow transmission of large amounts of power generated at end-user locations to be transferred from one end-user location to another.

Figure 1:
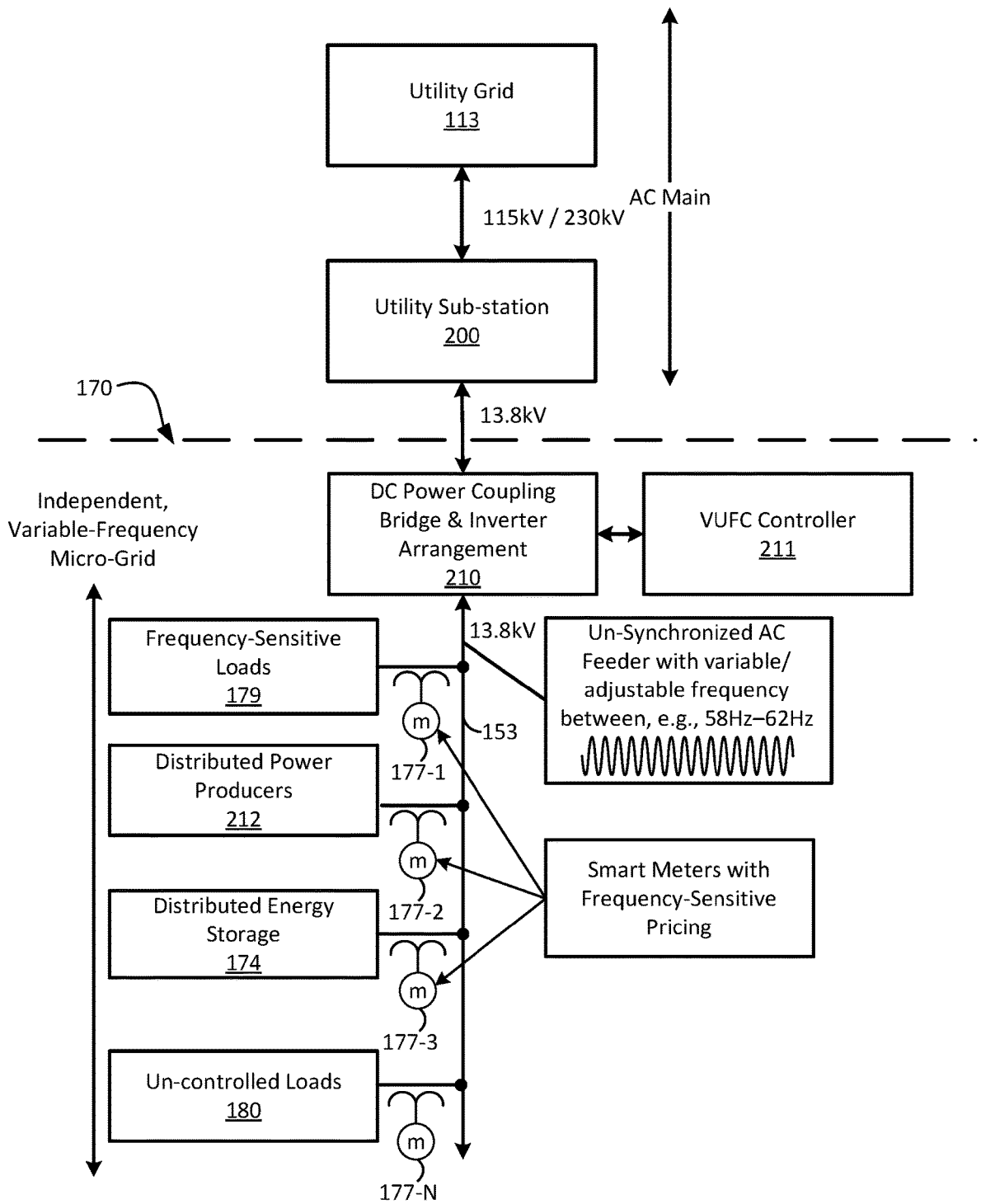
FIG. 1 is a block diagram of a variable utility frequency control (VUFC) system, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

The introduction of power from end-user locations is but one solution to help ensure an adequate amount of power is available at market-competitive rates, and that renewable forms of energy continue to increase in availability. Aspects of the present disclosure recognize that market forces, such as current energy prices, can allow energy distribution systems to intelligently reduce power consumption whenever possible. Likewise, market forces can allow for power to be introduced back onto a grid when such power may be profitable to sell. Current micro-grid power distribution approaches are synchronized to a commercial grid and can utilize outerband signals to control power flow, which in practice is too slow to react to the control needs of the grid, and thus their penetration capacity is limited.

Moreover, current micro-grid approaches operate, in a general sense, as islands without concern or involvement in enhancing frequency stability in the main utility grid. This job has been largely left to effective, but slow-acting, "large" power producers, such as coal-fired turbine generators, that can receive remote commands on a periodic basis (e.g., every 2 seconds or so) to increase/decrease rotation to stabilize grid frequency.

Thus, in accordance with an embodiment of the present disclosure, a method is disclosed for providing a variable output micro-grid frequency in order to cause loads and producers coupled to a micro-grid to change operating modes/behaviors accordingly. For example, the utility frequency delivered via the micro-grid may be used as a control signal for the purposes of demand response, e.g., increasing or decreasing load, energy storage control, e.g., to cause storage of energy or the discharging of energy, and generator output curtailment as is mandated by generator interconnection standards such as UL1741 for output power curtailment under high frequency, for instance.

In addition to frequency adjustments to affect loads coupled to a micro-grid, load adjustments may also be based on proportional voltage changes, whereby loads, or more particularly machinery generating a load, may measure a present voltage level and increase/decrease load in response to detecting a change between a measured voltage level and a previously measured level.

In an embodiment, a method is disclosed for using frequency monitoring as a part of smart meter pricing calculations, such that different prices for power flow in each direction can be made based on recorded power flows as a function of frequency. Direction, within this context, may be understood to be power flowing to a load from a feed, or power flowing from and to an energy store (e.g. a battery) or generator. This may advantageously be utilized to incentivize power-consuming customers and generators to operate in more economical ways to optimize utility assets.

In an embodiment, a method is disclosed for providing so-called "synthetic inertia" by a micro-grid in order to enhance frequency stability in an upstream commercial power grid. The term synthetic inertia, as generally referred to herein, refers to relatively fast load changes (e.g., measured in milliseconds) that allows a number of micro-grids to participate in enhancing upstream grid stability based on receiving a control signal via, for example, a radio frequency (RF) link between a central controller that monitors grid frequency and a controller of a micro-grid that is configured to cause fast load changes. In some cases, the control signal may cause the controller of a micro-grid to increase power drawn from a commercial power grid and supply at least a portion of the increased power to a dump resistor. Such dumping of power may occur until, for example, the controller of the micro-grid receives a subsequent command signal from the central controller. In an embodiment, a variable utility frequency control (VUFC) system is disclosed that implements various aspects and embodiments disclosed herein.

Various embodiments disclosed herein are directed to micro-grids. The micro-grids disclosed herein may be configured substantially similar to the micro-grid systems described in the U.S. Pat. No. 8,183,714 ('714 Patent), which is herein incorporated by reference in its entirety. As should be apparent in light of this disclosure, the techniques disclosed herein may be used in conjunction with various embodiments of the '714 Patent.

While the following disclosure references one or more specific types of renewable power, this disclosure is not solely to renewable power. For example, this disclosure is also applicable to local natural gas generation and energy storage, all of which are limited by capacity for synchronous interconnection. Thus, an embodiment of the present disclosure is directed to a "non-synchronous" solution that overcomes these constraints.

Now referring to the figures, FIG. 1 shows an example diagram of one such VUFC system 170, in accordance with an embodiment of the present disclosure. As shown, the VUFC system 170 includes a utility substation 200, coupling bridge and inverter arrangements 210 or power couplings, a VUFC controller 211, an un-synchronized AC feeder 153, frequency-sensitive loads 179, distributed power producers 212, distributed energy storage 174, uncontrolled-loads 180, and a plurality of smart meters 177-1 to 177-N. The VUFC system 170 is shown in a highly simplified form for ease of description and not for purposes of limitation.

In an embodiment, the utility grid may be configured to provide, for example, power at 115 kilovolt (kV) or 230 kV depending on a particular implementation. Thus the utility sub-station may step-down power such that an AC signal at 4 kV to 34 kV (e.g., 13.8 kV as shown) is provided to power coupling 210.

The VUFC controller 211 operates as a central controller for determining when to vary utility frequency to achieve a desired effect on load, power contribution back to the utility grid 113, and other frequency-sensitive functions. The power coupling 210 may include circuitry arranged to perform AC to DC conversions, and vice-versa, and can be configured to receive AC power at an input from the distribution line and convert the same to DC power. The power coupling 210 may be further configured with an inverter arrangement configured to provide AC power at an output to an associated power feeder, such as the power feeder 153 associated with the power coupling 210. Some example inverter devices particularly well suited for use within the power coupling 210 is described in the '714 Patent. As will be appreciated in light of this disclosure, the particular example inverter devices of the '714 Patent may be modified to accommodate medium-voltages (e.g., voltages in about 4 kV) in accordance with various embodiments disclosed herein.

The power feeder 153 may thus have an unsynchronized AC signal regulated by the power coupling 210 relative to the AC mains signal from the utility grid 113. Accordingly, the VUFC controller 211 can control various aspects of the AC signal, such as frequency, without concern for the frequency of an AC signal provided by the utility grid 113. The VUFC controller 211 may include a plurality of selectable frequencies stored in a memory (not shown), and may use the same to control a given power coupling to achieve an output AC signal with particular waveform characteristics. Thus the power feeder 153 may provide an AC power signal having a variable or otherwise adjustable frequency between, for example, 58 Hz-62 Hz, although other frequency ranges are equally applicable to the present disclosure. In an embodiment, the power feeder 153 has provides a voltage of about 13.8 kV, although other voltages are within the scope of this disclosure. The power feeder 153 may physically span a relatively long distance of, for example, up to 20 or more miles depending on a desired configuration.

The frequency-sensitive loads 179 may comprise N number of electrical loads electrically coupled to the power feeder 153. Some example electrical loads include heating, ventilation, and air conditioning (HVAC) equipment, although numerous other types of electrical equipment will be apparent in light of this disclosure. Each of the frequency-sensitive loads 179 may include frequency-measuring circuitry, and may be configured to measure a frequency of the power feeder 153 and adjust power consumption accordingly. In some cases, frequency measurements are continuously performed at a relatively high rate such that fast load switching may occur in response to a utility frequency change.

For example, each of the frequency-sensitive loads 179 may enter a low-power mode in response to measuring a low utility frequency of about 58 Hz, thereby reducing power consumption or switching-off. Likewise, each of the frequency-sensitive loads 179 may enter a non-low-power mode or so-called "normal" mode in response to measuring a relatively high frequency of about 62 Hz, for example. High and low frequencies may thus be essentially used as a logical on/off or toggle switch to affect various load behaviors. While specific high and low frequencies are discussed herein, numerous other frequency ranges may be utilized and are within the scope of this disclosure.

Distributed power producers 212 may include any electrical generation equipment capable of producing power and providing the same to an associated feeder, such as the feeder 153. Such distributed power producers may include, for example, solar, diesel generators, natural gas combined heat and power, and wind turbines, just to name a few.

Distributed energy storage 174 may comprise any equipment capable of storing energy and selectively providing the same back (e.g., based on a command signal such as a frequency change) to an associated feeder, such as the feeder 153. The distributed energy storage 174 may comprise N number of batteries (or banks of batteries) located at various locations along a given feeder. The distributed energy storage 174 may receive power for storage purposes via the utility grid 113 or the distributed power producers 212, or both. The distributed energy storage 174 may include frequency-measuring circuitry, and may be configured to measure a frequency of the power feeder 153 and adjust power consumption accordingly. Frequency measurements may be continuously performed at a relatively fast-rate, such that fast load switching may occur in response to a utility frequency change. The distributed energy storage 174 can enter a discharge mode in response to measuring a low utility frequency, thereby providing stored power to an associated feeder. Likewise, the distributed energy storage 174 may enter a storage-mode in response to measuring a high frequency. High and low frequencies may be thus essentially used as a logical on/off or toggle switch to affect the extent power is stored or discharged. Such "low" and "high" frequencies may vary in steps from a range of about 58-62 Hz, although other ranges may be utilized and are within the scope of this disclosure.

Smart meters 177-1 to 177-N may be configured to measure bi-directional power flow at different frequencies, and thus, may record how much power was consumed at one frequency versus another. Each frequency may be associated with a particular price of power, and thus, the historical data or recorded flows may allow for so-called frequency-sensitive pricing schemes that produce calculations as function of direction and frequency. This may advantageously incentivize power consumers and generators to operate in economical ways to optimize utility assets.

Figure 2:
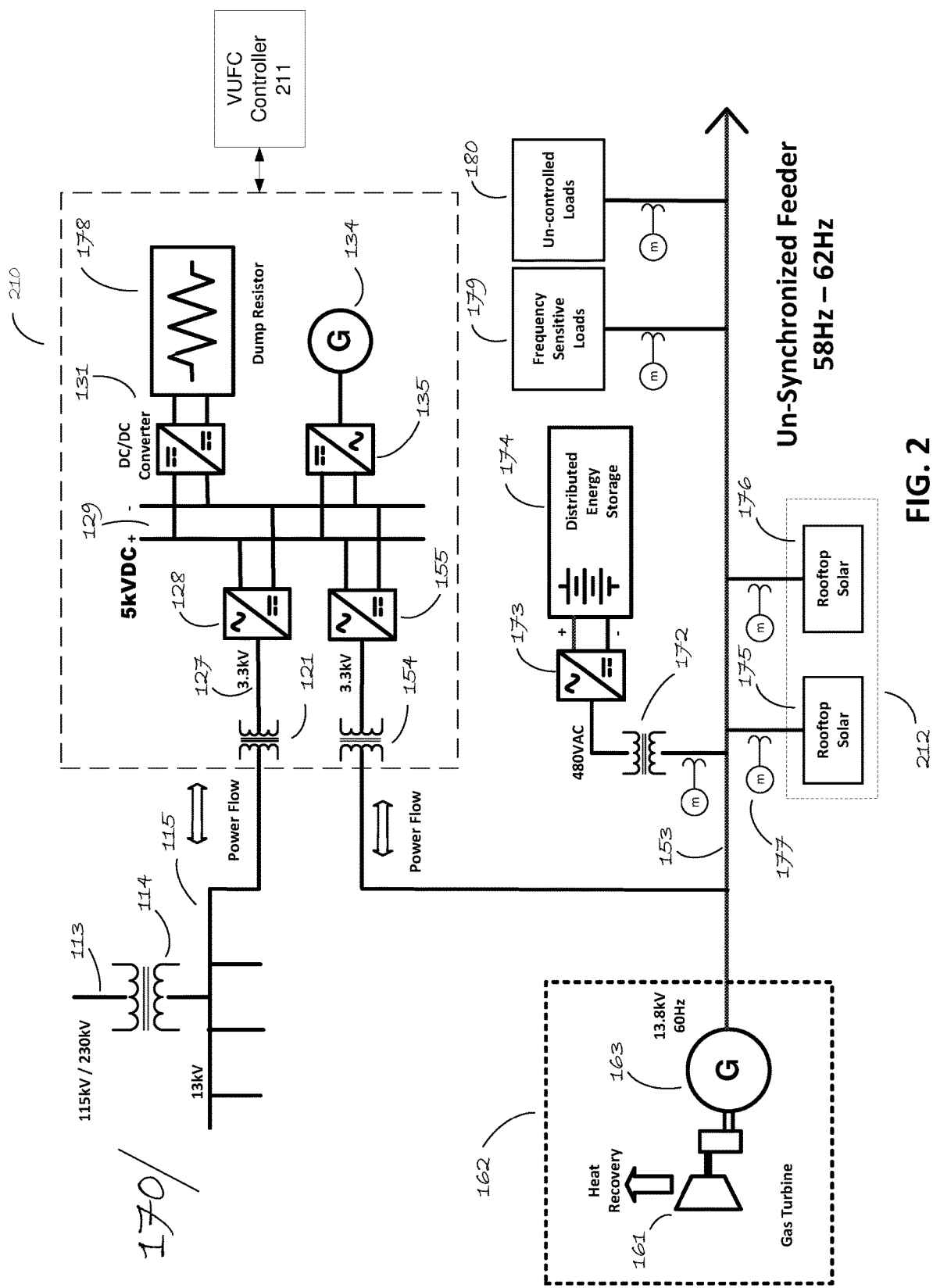
FIG. 2 is an example schematic view of the VUFC system of FIG. 1, in accordance with an embodiment of the present disclosure.

Now turning to FIG. 2, a schematic view of the example VUFC system 170 of FIG. 1 is illustrated, in accordance with an embodiment of the present disclosure. In particular, FIG. 2 illustrates an installation with an independent grid supporting at least one feeder 153 coupled to various loads, energy stores, and generators. The various loads, stores, and generators may be disposed in one or more buildings and may be disposed at large physical distances apart (e.g., up to and over 20 miles apart). Power from the utility grid 113 may be stepped-down by the transformer 114 to 13.8 kV and provided to the distribution line 115. From distribution line 115, utility power may be passed through transformer 121, stepped down to about 3.3 kV by the same, and provided to line 127. At line 127, the AC power at 3.3 kV may be inverted at inverter 128 and provided to DC bus 129 as a DC signal. From the DC bus 129, power may be output as an AC signal/waveform at 3.3 kV by the inverter 155 to a transformer 154. The transformer 154 may step up the AC signal to, for example, 13.8 kV before being introduced into the feeder 153. In an opposite direction, the transformer may step down power supplied via the feeder 153 and provided to the inverter 155. The inverter 155 may then convert the AC signal to DC and provide the same to the DC bus 129. The power coupling 210 may thus introduce power back onto the power grid 113, through feeder 115 if such power flow is desired. Thus the power coupling 210 provides an independent power grid, e.g., by way of feeder 153. From the perspective of the grid 113, the independent grid may be viewed as an inverter like an energy storage system.

A generator 134 can provide power to inverter 135, and from there to the DC bus 129. In FIG. 2 there is no requirement that the generator 134 provide a power signal synchronized with, grid 113, or any other distribution line within the VUFC system 170 and may be a variable speed generator.

As shown, the VUFC system 170 may include an optional plant 162 with a gas turbine 161. The turbine 161 may turn generator 163, which supplies AC power (in this example, at 13.8 kV) to the feeder 153. In this way, loads and upstream grid 115 are able to draw upon the power from the generator 163.

To the extent that inverter 155 serves as an inverter (delivering power from DC bus 129 to feeder 153), the inverter 155 may be synchronous with generator 163. But neither the inverter 155 nor the generator 163 is required to be synchronous with the utility grid at 113 or the distribution line 115. Note that the inverter 155 may comprise a three-wire current source, and may synchronize to the voltage source of the generator 163.

In an embodiment, each feeder, such as feeder 153, has a single power source that defines the voltages on the feeder, e.g., thus called a "voltage source." Any other power sources that also deliver power to the feeder 153 may not be voltage sources but may be current sources. Thus in some arrangements the inverter 155 may serve as a current source and not a voltage source. For example, the generator 163 may go out of service due to manual intervention or fault, or otherwise not be present based on a particular configuration of the micro-grid. Thus, another power source such as inverter 155 may automatically switch into a voltage-source mode such that the inverter 155 acts as a voltage source for the feeder 153.

With further reference to FIG. 2, many advantages and benefits of the disclosure can be appreciated. For example, the inverter 128 may be configured so that the power flow is solely from left to right in FIG. 2, or top to bottom in FIG. 1. In a general and functional sense, the system path to the right of inverter 128 is electrically isolated such that power is not introduced in a right-to-left fashion unless that flow is warranted to, for example, provide power back to a commercial utility grid for economic reasons, for example.

Also, embodiments disclosed herein allow power stored via the distributed energy storage 174 to be fed into feeder 153 to be made available to other end users. This may take place through inverter 173 and transformer 172, which may, for example, step up locally generated power at 480 VC to a 13 kV level which may be more suitable to distribution to the other end-users, along the entire length of the feeder. The amount of power that can be shared from one end-user location to the next (using feeder 153) may be far, far greater than the amount of power that could be shared if the only sharing mechanism were that of the distribution line 115.

In addition, components of the power coupling 210 may be configured to respond to out-of-band signaling that permits taking action based upon events such as price changes from the ISO market.

The VUFC controller 211 includes hardware, software, or any combination thereof configured to receive out-of-band signals, from a Utility SCADA or the ISO, much like an energy storage system does.

Methodologies and Architecture

In an embodiment, a method for controlling a feeder by adjusting the output utility frequency. The method may use the utility frequency as a control signal for demand response and energy storage control, and for generator output curtailment. There can also be a change to resistive loads, with a proportional voltage change. The method may include acts of determining an event (e.g., real-time change to the cost of power) or fault circumstance (e.g., outages along a commercial power grid) occurred. In response to determining the event or fault circumstance, the method may include changing an output frequency of a feeder, such as feeder 153, from a first frequency to a second frequency. The range/plurality of suitable frequencies may be, for instance, 58 Hz to 62 Hz. In some cases, the first frequency is a high frequency (e.g., 62 Hz) and the second frequency is a relatively lower frequency (e.g., 60 Hz). This change in frequency may be configured to cause frequency-sensitive loads, such as frequency-sensitive loads 179, to adjust current drawn in accordance with the frequency change. For instance, in the case of going from a relatively high frequency to a relatively low frequency, the frequency sensitive loads 179 may enter a low-power mode, or completely switch off. In addition, distributed energy storage 174 coupled to a feeder may store or discharge power based on a measured frequency such that changes to the same may cause distributed energy storage 174 to favor storing power or discharging power, depending on a desired mode.

In an embodiment, a method is disclosed for a fast change in frequency for the output feeder, e.g., feeder 153, in order to affect load changes to the power flow through the inverter, such as inverter 155, providing power to the feeder. For example, if inverter 155 is used to control voltage and frequency on feeder 153, either with or without the synchronous generator 163 connected with it in frequency following mode, the output frequency can be changed on the next half cycle to effect load changes for connected loads. This may provide for fast changes (e.g., in milliseconds) in the power flow to or from inverter 155. This could be used, for instance, in the event of a loss of the upstream utility energy supply, without the feeder 153 being taken off-line.

In another embodiment, a method of using frequency monitoring is disclosed. The method may employ relatively simple and inexpensive components/circuitry and may use hardware and/or software that is configured to change loads (e.g., turn on/off or otherwise adjust power consumption) in response to detecting a change in measured frequency.

In more detail, each of the frequency sensitive loads 179 may include a controller (comprising a circuit, processor or other suitable hardware and/or software) that acts very quickly (e.g., in the milliseconds) to reduce or increase load upon measurement of a change in the fundamental frequency of the feeder 153. This may include simple underfrequency breaker protection, or switched loads from a building control system, or more advanced load controls from controllers such as variable frequency drives (VFDs).

On the other hand, uncontrolled loads 180, such as resistive or spinning type loads, can respond to changes in voltage (resistive) or frequency (spinning) to change load. The term "uncontrolled" as used herein refers to those components that may not necessarily be controllable via a frequency change, but may be otherwise controllable using other approaches.

In an embodiment, a method of frequency monitoring for distributed energy storage is disclosed and may allow the same to relatively quickly (e.g., within a few milliseconds or less) charge or discharge energy based on a measured grid frequency deviation from normal. For example, a so-called "normal" frequency may include 60 Hz. Thus a change from a first frequency (e.g., normal) to a second frequency may cause a proportional change in the behavior of distributed energy storage 174.

In more detail, inverter 173 may implement the aforementioned method of frequency monitoring for distributed energy storage and thus be configured to store or release energy relatively quickly (e.g., in milliseconds) based upon measurements of the frequency component of feeder 153. The approach in conjunction with the frequency based load controls discussed above can help regulate the power draw to or from the upstream utility grid 113, or assist in balancing load during island mode operation, e.g., when the upstream utility grid 113 experiences a fault or is otherwise offline.

In another embodiment, a method is disclosed for using frequency monitoring to reduce power flow from inverter based solar power, or power from other distributed generator devices such as wind turbines. For example, solar power systems with inverters 175 and 176, for example, may be connected to feeder 153, such as illustrated in FIG. 2. The inverters may be pre-programmed or otherwise programmable to inhibit output power flow if the measured frequency is relatively high (e.g., above a particular threshold value), and this method may use this behavior to reduce power flow in times when there is excess solar power (e.g., on sunny days) that may not have use by the feeder 153 for storage/consumption or transmission back to the grid 113. This may protect the overall system 170, the feeder 153, and the upstream commercial utility grid 113 from the dangers of excess, uncontrolled, solar power (or other similar forms of power such as window power), and therefore may allow for much higher penetration levels (e.g., the number of solar panels/sites installed) of solar power in a distribution feeder.

In an embodiment, a method for using a dump resistor to reduce power flow from an inverter-based solar/renewable power is disclosed. In more detail, the dump resistor controller 131 or DC/DC converter may be programmed to dump net energy into resistor 178 to enable the system 170 to prevent sending energy upstream into distribution line 115 in order to protect the upstream power grid 113 from excessive reverse power flow, while also keeping the feeder 153 up/operational while it is being re-balanced during excessive solar power production, or loss of load. Note this method is equally applicable to other renewable energy sources such as wind turbines. In some cases, this includes excess power from rotating generators such as 163 as well, and may include balancing power flow needs during loss of feeder 115 during times when power is being dispatched upstream.

In another embodiment, a method using frequency monitoring within smart meter pricing calculations is disclosed. The method may assign different prices for power flow in each direction and may make calculations based on recorded power flows as a function of direction and frequency. For example, a first frequency may be assigned (or associated with) a first dollar amount while a second frequency may be assigned (or associated with) a second dollar amount. Thus smart meters may advantageously price power based on whether, for example, power is consumed from a commercial utility grid, or from producer that is local to a given micro-grid/feed. This can be used by utilities to incentivize customers and generators to operate in more economical ways to optimize the utility assets.

In more detail, the smart meter 177, and others illustrated on feeder 153, can be programmed to measure power flow at different frequencies, and as such, can have different prices assigned to the power. This approach is applicable to power in either direction. Thus, the grid operator or regulating authorities can achieve balancing of the power system through market pricing mechanisms. For instance, operators of energy storage systems can program their systems to take power at higher frequencies, e.g., as controlled by the inverter 155 and the VUFC controller 211, when prices are low, and deliver power at lower frequencies when prices may be higher. As discussed above, distributed power producers 212 and frequency-sensitive loads 179 may behave in a similar fashion to adjust according to market pressures and other economic factors.

Thus, system balancing can be achieved without the necessity of complex communication links or complicated utility control algorithms. Further, it can be expanded as market conditions dictate without further impacts to the upstream utility grid 115 or 113.

In another embodiment, a method of sensing that the alternator has tripped or failed by an inverter synchronized to the same is disclosed. In response to detecting a trip or failure, the inverter may "ride through" the disturbance and switch control modes to become the voltage source. In more detail, when the alternator 163 or generator is providing the voltage source for feeder 153, and inverter 155 is providing current source stability, if alternator 163 trips out of the circuit, inverter 155 senses the loss, rides through the disturbance as the generator breaker opens, and then changes its operating mode to provide voltage source control for feeder 153. This can include systems of multiple synchronous generators, where the feature may help keep some generators on-line, but if they all drop off and there is no voltage source, the inverter 155 may become the voltage source.

Methods in Support of Independent System Operator (ISO) Grid Stability

In an embodiment, a method for using a feeder, such as feeder 153, as essentially a micro-grid controlled by VUFC is disclosed. This method uses a feeder instead of a more conventional arrangement that uses a dedicated inverter with energy storage, such as the arrangement shown at 173 and 174 of FIG. 2. Thus, the relatively fast load changes required to provide frequency stabilization normally sourced or sinked by a battery can come from the entire feeder which includes a combination of energy storage load control and generator curtailment, for example.

In another embodiment, a method of using the VUFC system 170 to assist when a system-wide outage causes a utility grid to perform recovery. In particular, one such example method includes using a dynamic braking approach to help black start a wide-area system by having the ISO program the dump resistors, such as dump resistor 178, to ramp up power intake and dump the power into resistors for a short time, allowing the ISO grid to supply the increased load, and then stop the resistive power draw immediately upon closing of a large high voltage breaker elsewhere on the ISO grid, such that the power supply requirements from the wide-area grid are kept relatively smooth during the breaker high voltage re-energization.

An out-of-band signal from the ISO or other control authority commands the DC/DC converter 131 to increase the energy flow into resistor 178 over a few seconds, drawing power from feeder 113, and then to cut this flow to zero upon further command. The VAR control features of inverter 128 may also be employed to help stabilize the system voltage during such an event.

In another embodiment, a method for using a feeder, such as feeder 153, as a microgrid to assist in providing power to a dump resistor as required by an ISO or other controlling authority during high voltage breaker re-energization is disclosed. In particular, the VUFC controller 211 may implement the method and cause a load, as seen by the power grid 113, to increase for a predefined amount of time (e.g., a few seconds) followed by a sudden or otherwise immediate drop in load (e.g., to zero).

In one embodiment, various inverters disclosed herein (e.g., inverter 128 and 155) may be configured to handle a medium voltage, e.g., 3.3 kV, and may comprise 3-level inverter with a neutral-point-clamped (NPC) topology. Thus, for instance, a 3.3 kV AC RMW feed boosts to a regulated 5 kV DC in accordance with an embodiment. In some cases, the NPC inverters disclosed herein may comprise a 3-wire or 4-wire configuration.

The term "coupled" as used herein refers to any connection, coupling, link or the like by which signals/energy carried by one system element are imparted to the "coupled" element. Such "coupled" devices are not necessarily directly connected to one another and may be separated by intermediate components or devices that may manipulate or modify such signals.

In accordance with an aspect of the present disclosure a method for performing variable utility frequency control (VUFC) of a micro-grid in a normal grid-tied state whereby the micro-grid is electrically coupled to a utility grid is disclosed. The method comprising determining, by a controller, an event related to an upstream utility energy grid, determining, by the controller, at least one of a frequency value or a voltage value in response to determining the event, and sending, by the controller, an adjustment value to at least one inverter, the adjustment value comprising a representation of the frequency value and/or the voltage value, wherein the adjustment value causes the at least one inverter to output an AC signal to a feeder based on the adjustment value.

In accordance with another aspect of the present disclosure a system is disclosed. The system comprising a controller configured to perform variable utility frequency control (VUFC) of a micro-grid, a power coupling arrangement configured to be communicatively coupled to the controller, the power coupling arrangement comprising an input configured to be electrically coupled to a distribution line to receive an AC signal, the AC signal being provided by a commercial utility grid, and an output configured to be electrically coupled to a feed of the micro-grid having at least one load coupled thereto, the output configured to provide the feed with an AC signal that is un-synchronized from that of the AC signal received at the input, wherein the controller is configured to cause the power coupling arrangement to output an AC signal having a frequency selected from a plurality of selectable frequencies, each frequency of the plurality of selectable frequencies being configured to cause the at least one load coupled to the micro-grid to adjust an amount of power drawn therefrom.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for performing variable utility frequency control (VUFC) of a micro-grid in a normal grid-tied state whereby the micro-grid is electrically coupled to a utility grid, the method comprising:
   determining, by a controller, an event related to an upstream utility energy grid;
   determining, by the controller, at least one of a frequency value or a voltage value in response to determining the event; and
   sending, by the controller, an adjustment value to at least one inverter, the adjustment value comprising a representation of the frequency value and/or the voltage value, wherein the adjustment value causes the at least one inverter to output an AC signal to a feeder based on the adjustment value, the AC signal output to the feeder having a medium voltage; and
   wherein the at least one inverter includes a first inverter at an input of the micro-grid and a second inverter at the output of the micro-grid, and wherein the first inverter and the second inverter are configured to output an AC signal with a medium voltage.

2. The method of claim 1, wherein the event related to the upstream utility energy grid is a power-outage event or a price change event.

3. The method of claim 1, wherein sending the adjustment value further comprises setting the adjustment value to cause the at least one inverter to change output frequency from a first frequency to a second frequency, the second frequency being a lower frequency than the first frequency.

4. The method of claim 3, wherein the second frequency is associated with a low-power mode, and wherein the adjustment value sent to the at least one inverter is configured to cause the output AC signal to have the second frequency to cause at least one frequency-sensitive load to enter the low-power mode or to switch off.

5. The method of claim 1, wherein the adjustment value is configured to cause the inverter to change from a first frequency to a second frequency within a next half cycle of the AC signal output to the feeder.

6. The method of claim 1, further comprising:
measuring, by a frequency-sensitive load, a first frequency value associated with an AC signal; and
determining the measured first frequency value is different than a previously measured frequency value, and in response thereto, adjusting an amount of power drawn from a feeder by the frequency-sensitive load.

7. The method of claim 1, further comprising:
measuring, by a generator device, a first frequency value associated with an AC signal; and
determining the measured first frequency value is different than a previously measured frequency value, and in response thereto, adjusting an amount of power provided to a feeder by the generator device.

8. The method of claim 7, wherein adjusting an amount of power further comprises reducing an amount of wind-generated power or solar-generated power, or both, provided to a distributed energy store.

9. The method of claim 1, further comprising:
measuring, by a dump resistor controller, a first frequency value associated with an AC signal; and
determining, by the dump resistor controller, the measured first frequency value is different than a previously measured frequency value, and in response thereto, providing power to a dump resistor.

10. The method of claim 9, wherein the power provided to the dump resistor is wind-generated power or solar-generated power, or both.

11. The method of claim 1, wherein the medium voltage is 3.3 kilovolt (kV).

12. A system, comprising:
a controller configured to perform variable utility frequency control (VUFC) of a micro-grid;
a power coupling arrangement configured to be communicatively coupled to the controller, the power coupling arrangement comprising:
an input configured to be electrically coupled to a distribution line to receive an AC signal, the AC signal being provided by a commercial utility grid; and
an output configured to be electrically coupled to a feed of the micro-grid having at least one load coupled thereto, the output configured to provide the feed with an AC signal that is un-synchronized from that of the AC signal received at the input;
wherein the controller is configured to cause the power coupling arrangement to output an AC signal having a frequency selected from a plurality of selectable frequencies, each frequency of the plurality of selectable frequencies being configured to cause the at least one load coupled to the micro-grid to adjust an amount of power drawn therefrom; and
wherein the power coupling arrangement includes at least one inverter at the input and at least one inverter at the output, and wherein each inverter at the input and the output are configured to provide an AC signal having a medium voltage.

13. The system of claim 12, wherein the medium voltage is 3.3 kilovolt (kV) and the inverter boosts an output signal to a regulated 5 kV DC.

14. The system of claim 12, wherein the at least one load coupled to the micro-grid includes a frequency measurement circuit configured to measure a frequency of power provided by a feeder and make adjustments to power drawn from the feeder in accordance with a change in measured frequency.

15. The system of claim 12, wherein a first frequency of the plurality of selectable frequencies is configured to cause a load to enter into a low-power mode.

16. The system of claim 12, wherein the controller is further configured to cause the power coupling arrangement to output an AC signal having a voltage selected from a plurality of selectable voltages, the selected voltage being associated with a proportional change in frequency, each voltage of the plurality of selectable voltages being configured to cause the at least one load coupled to the micro-grid to adjust an amount of power drawn therefrom.

17. The system of claim 12, wherein the inverter includes a 3-level neutral-point-clamped topology.

18. A system, comprising:
a controller configured to perform variable utility frequency control (VUFC) of a micro-grid;
a power coupling arrangement configured to be communicatively coupled to the controller, the power coupling arrangement comprising:
an input configured to be electrically coupled to a distribution line to receive an AC signal, the AC signal being provided by a commercial utility grid; and
an output configured to be electrically coupled to a feed of the micro-grid having at least one load coupled thereto, the output configured to provide the feed with an AC signal that is un-synchronized from that of the AC signal received at the input;
wherein the controller is configured to cause the power coupling arrangement to output an AC signal having a frequency selected from a plurality of selectable frequencies, each frequency of the plurality of selectable frequencies being configured to cause the at least one load coupled to the micro-grid to adjust an amount of power drawn therefrom; and
wherein the power coupling arrangement includes at least one inverter at the input and at least one inverter at the output, and wherein each inverter at the input and the output are configured to provide an AC signal having voltage of 3.3 kilovolts.

* * * * *